Dec. 10, 1935.                 S. J. STEENSEN                2,023,709
                             DISHWASHING MACHINE
                             Filed June 24, 1930
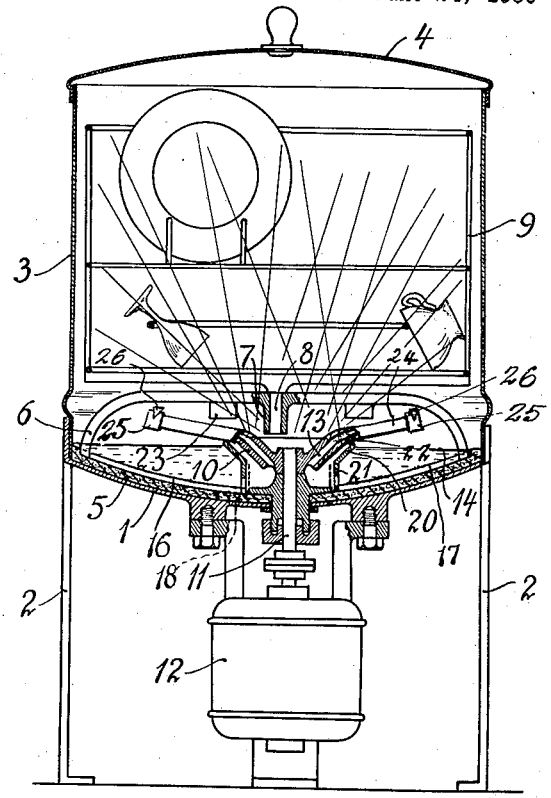
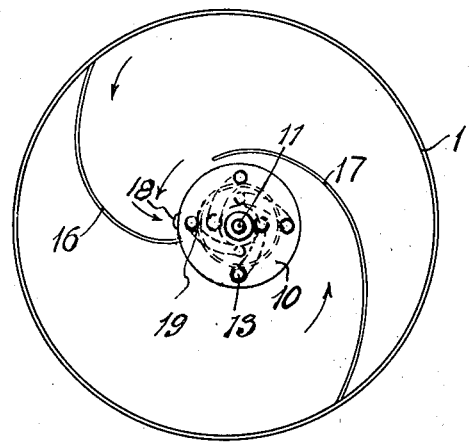

Patented Dec. 10, 1935

2,023,709

UNITED STATES PATENT OFFICE 2,023,709

DISHWASHING MACHINE

Sverre Johan Steensen, Oslo, Norway

Application June 24, 1930, Serial No. 463,546
In Germany December 21, 1929

2 Claims. (Cl. 141—9)

This invention relates to dish washing machines of the kind wherein the dishes are arranged in one or more baskets which, during the operation of the machine, are caused to rotate inside a container and are subjected during this motion to the action of jets of water.

According to the present invention there is arranged in the bottom of the container a combined rotating pump and spreader for flinging the water from the bottom against the dishes and the container walls as upwardly directed rotating jets. The spreader is arranged above the normal water level and has upwardly diverging channels passing therethrough, said channels having lower upwardly diverging portions in relation to the spreader axis for sucking the water from the bottom and slinging it against the dishes and the container walls. The spreader may be provided on its upper side with hollow drying fan blades provided in their outer ends with mouthpieces adapted to sling out and up water forced into the blades from the spreader. If desired a stationary cap may be provided which surrounds the spreader and which permits the access of water to the spreader channels at its bottom and fits closely the spreader at the top. Preferably, the top edge of said cap is provided with a number of holes adapted to direct water in non-rotating jets up into the container.

A constructional form of the machine is illustrated by way of example on the annexed drawing.

Fig. 1 is a sectional elevation of the machine.

Fig. 2 is a plan of the bottom proper.

Fig. 3 is a sectional view drawn to a larger scale of a portion of a blade of the drying fan in a form of the machine particularly adapted for manual driving.

The tapered or downwardly curved bottom 1 of the dish washing machine is supported by legs 2 and receives a cylindrical container 3 with its cover 4. The interior of the bottom is lined with heat insulating material 5, and a bridge 6 having a depending hub 7 rests thereon or is attached thereto. Said hub receives a vertical journal 8 attached to the lower end of a dish basket 9. The dishes to be washed are arranged in suitable manner in the basket and the latter is set in rotation automatically by means of jets of the wash water during the circulation of said water inside the machine.

Eccentrically mounted in the bottom 1 is a spreader 10, the same being arranged at the upper end of a vertical shaft 11 projecting down and out through said bottom 1 and coupled to an electric motor 12 or the like, so that the spreader may be set in rapid rotation. The spreader has a plurality of outwardly and upwardly directed channels 13 whose lower inner ends dip into the hot water collecting in the bottom (the water level is denoted by the reference 14) and from whose upper ends the water is flung with great force in a sloping direction upwardly and outwardly against the dishes. Some of the jets hit the dishes and are deflected while others first hit the walls 3 of the container whence they are also deflected in different directions, so that the dishes are subjected efficiently to a scouring action from all sides. Owing to its rotation, the spreader operates not only as a pump or ejector to fling the water up into the container, but it also directs the jets at inclinations to the vertical whereby they set the basket 9 in rotation. The eccentric arrangement of the spreader results in the dishes being subjected to jets that strike at varying places during the rotation.

Experience has shown that the jets cause a too rapid rotation if the channels 13 are located in a radial plane.

In order to prevent this inconvenience the upper or outlet ends of the channels are curved or bent in a direction opposed to the direction of rotation. In this manner the rotational velocity of the basket is moderated.

The spreader tends to put the surrounding water in the bottom 1 in rotation. The result may be that the water in the bottom is flung outwardly and its level sinks at the centre. As a consequence the water level at the lower inlet end of the channels 13 might be constantly below the channels 13 so that the latter could not suck up water whereas the body of water in the bottom would be maintained in rotation owing to its contact with the upper portion of the spreader. To prevent this drawback the spreader is surrounded by a stationary cap 20, the lower edge 21 of which reaches below the level of the body of water around the cap under normal operation. Said lower edge is provided with perforations or with a sieve for the passage of the water. At the top the cap fits as tightly as possible against the outside of the spreader, but its upper edge may be provided with suitably distributed holes 22. Through these holes the water between the cap and the spreader may be flung upwards as jets which do not partake of the rotation of the spreader and whose direction, therefore, may be easily determined as desired, preferably in such a manner that the jets sweep the interior space of the container that may only be reached with difficulty by the rotating jets from the spreader channels 13.

To each arm of the bridge 6 there is preferably fixed a small blade 23 which is so shaped and positioned as to be hit by the jets from the channels 13, as they pass during the rotation of the spreader, whereby the jets are deflected preferably into a vertical direction upwards or inwards toward the basket axis. This also assists in obtaining a uniform directional distribution of the jets.

Further, a number of fan blades 24 is attached to the spreader 10 slightly above the water level 14, said blades serving to blow the air upwards through the container so as to dry the dishes after the wash water has been discharged.

In the bottom 1 below and around the spreader, a heating element, preferably an electric one (not shown) may be arranged.

Within the bottom there are arranged two or more stationary curved conducting rails 16, 17 (Fig. 2), and an outlet 18 which may be closed by a stopper or a cock. Solid particles and dirt which sink down into the rotating washing water are conducted by the one rail 16 inwards towards the outlet 18 above which they gather, the rail portion 19 being curved partly around said outlet. The other rail (or rails) 17 conduct solid particles inwards towards the rail 16 or towards the outlet as indicated by the arrows, the inner end of said rail terminating some distance from the outlet. Solid particles caught by the rail 17 are therefore conducted inwards around the spreader in a direction towards the outlet where they meet the stream of particles moving along the rail 16. When, after washing and rinsing, the outlet 18 is opened, the solid particles collected there pass out with the first flow of the water whereafter the remaining cleaning water flows out. Finally the air contained in the interior of the container is blown by the fan blades against the dishes causing them to be dried rapidly.

According to Fig. 3 the drying fan blades 24 are hollow and are provided at their ends with removable caps 25 having mouth pieces 26 for the purpose of serving as a water slinging device, if desired. In such a device the water is forced into the blades from the spreader and will pass out through the mouth pieces 26.

It is remarked that especially in manually driven machines an arrangement according to Fig. 3 is suitable for obtaining a slinging of water in addition to that caused by the channels 13.

I claim:

1. A dish washing machine comprising a wash water container, a dish basket mounted rotatably therein, a rapidly rotating pump and spreader having an upper surface and mounted in the container bottom so as to have its upper surface located above the normal water level in the bottom part of the container, said pump and spreader having channels passing therethrough and having lower upwardly diverging portions in relation to the spreader axis for sucking the water from the bottom and slinging it against the dishes and the container walls, the spreader being provided on its upper side with hollow drying fan blades provided in their outer ends with mouthpieces adapted to sling out and up water forced into the blades from the spreader.

2. A dish washing machine comprising a wash water container, a dish basket mounted rotatably therein, a rapidly rotating pump and spreader having an upper surface and mounted in the container bottom so as to have its upper surface located above the normal water level in the bottom part of the container, said pump and spreader having channels passing therethrough and the lower portions of which diverge upwardly in relation to the spreader axis for sucking the water from the bottom and slinging it against the dishes and the container walls, and a stationary cap by which the spreader is surrounded, said cap permitting the access of water to the spreader channels at its bottom and closely fitting the spreader at the top, the top edge of the cap being provided with a number of holes adapted to direct water in non-rotating jets up into the container.

SVERRE JOHAN STEENSEN.